(12) United States Patent
Ouyang et al.

(10) Patent No.: US 11,244,587 B2
(45) Date of Patent: Feb. 8, 2022

(54) FLEXIBLE DISPLAY PANEL AND FLEXIBLE DISPLAY DEVICE

(71) Applicant: Shanghai Tianma AM-OLED Co., Ltd., Shanghai (CN)

(72) Inventors: Junting Ouyang, Shanghai (CN); Baiquan Lin, Shanghai (CN); Kerui Xi, Shanghai (CN); Xiangzi Kong, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 99 days.

(21) Appl. No.: 16/719,588

(22) Filed: Dec. 18, 2019

(65) Prior Publication Data
US 2020/0126488 A1    Apr. 23, 2020

(30) Foreign Application Priority Data
Jun. 20, 2019   (CN) .......................... 201910536856.3

(51) Int. Cl.
| | |
|---|---|
| *G09G 3/20* | (2006.01) |
| *G09G 3/3275* | (2016.01) |
| *H05K 5/00* | (2006.01) |
| *G09G 3/00* | (2006.01) |
| *G06F 1/16* | (2006.01) |

(52) U.S. Cl.
CPC ............... *G09G 3/20* (2013.01); *G09G 3/035* (2020.08); *G09G 3/3275* (2013.01); *H05K 5/0017* (2013.01); *G06F 1/1652* (2013.01); *G09G 2340/14* (2013.01)

(58) Field of Classification Search
CPC ........ G09G 3/00; G09G 3/035; G09G 3/3275; G09G 2340/14; G09G 2380/02; G06F 1/1652; H05K 5/0017
See application file for complete search history.

(56) References Cited

U.S. PATENT DOCUMENTS

| | | | | |
|---|---|---|---|---|
| 2018/0040678 A1* | 2/2018 | Zhai | .................. | G06F 3/045 |
| 2018/0095574 A1* | 4/2018 | Kim | .................. | G06F 1/1677 |
| 2018/0321783 A1* | 11/2018 | Guo | .................. | G06F 3/0412 |
| 2019/0393278 A1* | 12/2019 | Wu | .................. | H01L 27/3225 |

FOREIGN PATENT DOCUMENTS

| | | |
|---|---|---|
| CN | 106020553 A | 10/2016 |
| CN | 107195667 A | 9/2017 |
| CN | 107885381 A | 4/2018 |

\* cited by examiner

*Primary Examiner* — Michael Pervan
(74) *Attorney, Agent, or Firm* — Alston & Bird LLP

(57) ABSTRACT

A flexible display panel and a flexible display device are described. The flexible display panel includes a bending region, a non-bending region. A number of deformation detection units are disposed in the bending region. The deformation detection units each includes a first electrode, a piezoelectric (PZT) material function layer and a second electrode which are sequentially stacked in a direction perpendicular to a light-emitting surface of the flexible display panel. The density of the PZT units and PZT function layer thickness may vary depending on their distance from the bending axis.

18 Claims, 7 Drawing Sheets

FLEXIBLE DISPLAY PANEL AND FLEXIBLE DISPLAY DEVICE

CROSS-REFERENCES TO RELATED APPLICATIONS

This application claims priority to a Chinese patent application No. CN201910536856.3 filed at CNIPA on Jun. 20, 2019, disclosure of which is incorporated herein by reference in its entirety.

TECHNICAL FIELD

This application relates to display technology field and in particular, to a flexible display panel and a flexible display device.

BACKGROUND

Flexible display panels have a bendable characteristic in addition to advantages of the conventional display panels, significantly expanding their applications.

When the flexible display panel is in a bent state, wires of the flexible display panel located close to a bending axis are influenced by a bending stress, which causes the display effect of the bending region of the display panel to be poor and affects normal display of the flexible display panel. To solve the above problems, it is necessary to compensate display images in the bending region. However, each position in the bending region has a different deformation amount, without knowing a compensation coefficient at each position, the image compensation cannot be implemented. Therefore, a detection device is desired for accurately measuring the deformation amount at each position in the bending region.

SUMMARY

The present disclosure provides a flexible display panel and a flexible display device for measuring a deformation amount in the bending region when the flexible display panel is in the bent state and accurately acquiring the deformation amounts at various positions in the bending region.

In a first aspect, an embodiment of the present disclosure provides a flexible display panel. The flexible display panel includes a bending region capable of bending a long a bending axis and a non-bending region.

At least one deformation detection unit is disposed in the bending region. Each deformation detection unit includes a first electrode, a piezoelectric material function layer and a second electrode, which are sequentially stacked along a direction perpendicular to a light-emitting surface of the flexible display panel.

In a second aspect, an embodiment of the present disclosure further provides a flexible display device. The flexible display device includes the flexible display panel described in the first aspect.

BRIEF DESCRIPTION OF DRAWINGS

Other features, objects and advantages of the present disclosure will become more apparent from a detailed description of non-limiting embodiments with reference to the drawings.

DETAILED DESCRIPTION

The flexible display panel and flexible display device provided by the present disclosure will described in detail with reference to exemplary embodiments and accompanying drawings.

An embodiment of the present disclosure provides a flexible display panel. The flexible display panel includes a bending region and a non-bending region.

At least one deformation detection unit is disposed in the bending region. Along a direction perpendicular to a light-emitting surface of the flexible display panel, the at least one deformation detection unit comprises a first electrode, a piezoelectric material function layer and a second electrode which are sequentially stacked.

The flexible display panel provided by the embodiment of the present disclosure includes the bending region and the non-bending region. At least one deformation detection unit is disposed in the bending region. Along the direction perpendicular to the light-emitting plane of the flexible display panel, the at least one deformation detection unit includes the first electrode, the piezoelectric material function layer and the second electrode, all sequentially stacked. When the flexible display panel is in a bent state, one deformation detection unit is able to implement detection of the corresponding the deformation position and amount in the bending region, providing a basis for subsequent luminance compensation according to the deformation amount, thereby effectively improving the display effect of the flexible display panel.

The embodiments of the present disclosure will be described clearly and completely in conjunction with the drawings in the embodiments of the present disclosure. Apparently, the embodiments described below are part, not all of the embodiments of the present disclosure. Based on the embodiments of the present disclosure, all other embodiments obtained by those skilled in the art without making creative work are within the scope of the present disclosure.

Details are set forth below to facilitate a thorough understanding of the present disclosure. However, the present disclosure may be implemented by other embodiments different from the embodiments described herein, and those skilled in the art may make similar generalizations without departing from the spirit of the present disclosure. Therefore, the disclosure is not limited to the specific embodiments described below.

In addition, the present disclosure will be described in detail in conjunction with the drawings. In detailed description of embodiments of the present disclosure, for ease of description, schematic diagrams illustrating structures of devices and components are not drawn to scale. The schematic diagrams are merely illustrative and are not intended to limit the scope of the present disclosure. In addition, manufacturing includes three-dimension spatial sizes: length, width and height.

Figure 1:
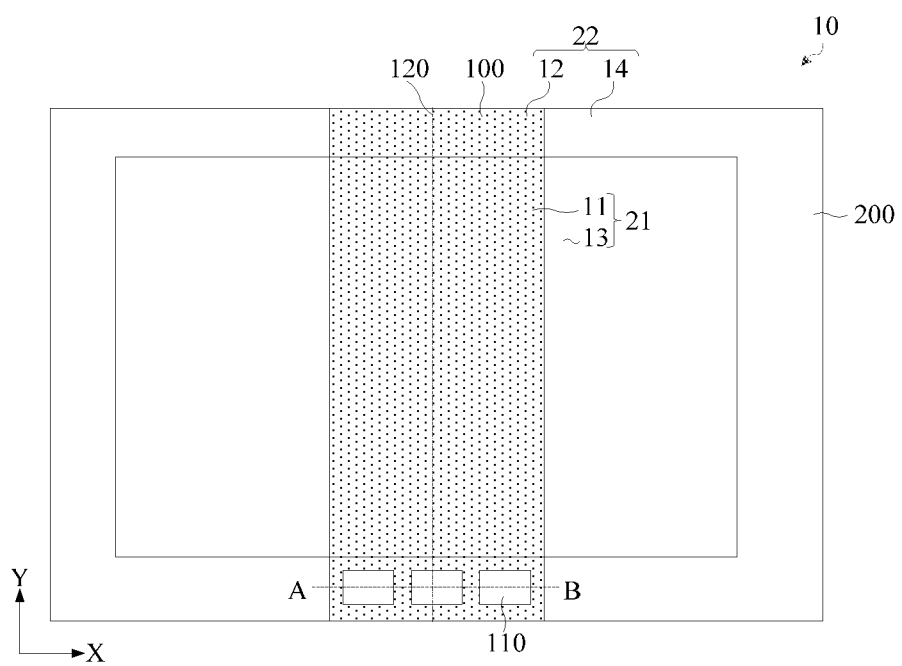
FIG. 1 is a schematic view of a flexible display panel according to an embodiment of the present disclosure.
Figure 2:
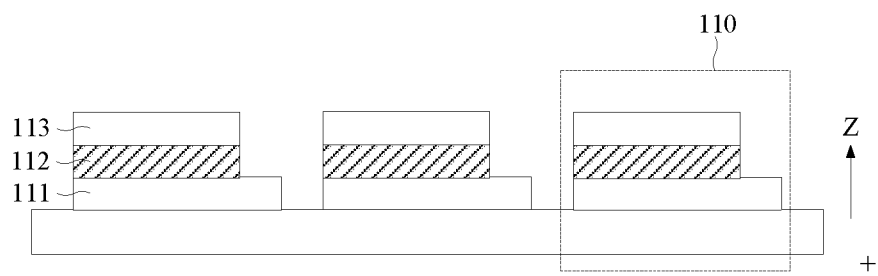
FIG. 2 is a cross sectional view of the flexible display panel taken along a line AB in FIG. 1.

FIG. 1 is a schematic view of a flexible display panel according to an embodiment of the present disclosure. As shown in FIG. 1, the flexible display panel 10 includes a bending region 100 and a non-bending region 200. At least one deformation detection unit 110 is disposed in the bending region 100. FIG. 2 is a cross sectional view of the flexible display panel 10 taken along a dotted line AB in FIG. 1. As shown in FIG. 2, along a direction Z perpendicular to a light-emitting surface of the flexible display panel, each of the at least one deformation detection unit 110 includes a first electrode 111, a piezoelectric material function layer 112 and a second electrode 113 which are sequentially stacked.

Referring to FIG. 1, the bending region 100 includes a bending axis 120. It is to be noted that FIG. 1 shows an example in which the bending region 100 includes three deformation detection units 110 and the three deformation detection units 110 are arranged in the X direction which is perpendicular to the Y direction along which the bending axis 120 extends, but the number of the deformation detection units 110 and their arrangement mode are not limited. In other implementation modes of the embodiment, the number of the deformation detection units 110 may also be 2, 4, or more. The deformation detection units 110 may be arranged in other modes, which is not specifically limited in this embodiment.

It is to be noted that, after the flexible display panel 10 is bent along the bending axis 120, the deformation amount on the bending axis 120 is the largest. In the X direction perpendicular to the Y direction in which the bending axis 120 extends, the position closer to the bending axis 120 has a larger deformation amount, and positions having the same distance to the bending axis 120 have the same deformation amount, i.e., in the bending region 100, each position of a line parallel to the bending axis 120 has the same deformation amount. Therefore, the deformation amount of each position of a line parallel to the bending axis 120 can be measured by using one deformation detecting unit 110 located on the line. In other embodiments, multiple deformation detection units 110 may be disposed on the same line parallel to the bending axis 120, the number of deformation detection units 110 arranged in a same line parallel to the bending axis 120 is not limited in the present disclosure. In addition, Y-direction positions of deformation detection units 110 disposed on different lines parallel to the bending axis 120 are not limited in the present disclosure. Exemplarily, the bending region 100 includes a first line and a second line, the first line and the second line are different lines parallel to the bending axis 120. A first deformation detection unit is disposed on the first line, and a second deformation detection unit is disposed on the second line. The first deformation detection unit and the second deformation detection unit may be sequentially arranged in the extending direction Y of the bending axis 120, or may be arranged in a same row in the extending direction X.

The piezoelectric material function layer 112 of the deformation detection unit 110 provided by the embodiment is disposed between the first electrode 111 and the second electrode 113. The piezoelectric material function layer 112 is made from piezoelectric materials. The piezoelectric material function layer 112 has a first surface in contact with the first electrode 111 and a second surface in contact with the second electrode 113. Electric charges are accumulated on the two surfaces of the piezoelectric material function layer 112 when a pressure is applied to the piezoelectric material, and the larger the pressure is, the more the electric charges are generated. These electric charges can be transmitted through the first electrode 111 and the second electrode 113 to a detection component, the detection component is configured to determine the magnitude of the pressure applied to the piezoelectric material according to the amount of the received charges. It is to be understood that the deformation is positively correlated with the pressure, that is, the larger the pressure is, the larger the deformation amount is. Therefore, the deformation magnitude can be determined according to the magnitude of the applied pressure, and the deformation amount at the position of the deformation detection unit 110 in the bending region is obtained. Exemplarily, the detection component may be a drive IC of the flexible display panel. It is to be understood that, in other implementation modes of the embodiment, the detection component may be another structure, which is not specifically limited in the embodiment.

The flexible display panel provided by the embodiment includes the bending region 100 and the non-bending region 200. At least one deformation detection unit 10 is disposed in the bending region 100. The deformation detection unit 110 includes the first electrode 111, the piezoelectric material function layer 112 and the second electrode 113 which are sequentially stacked in the Z direction perpendicular to the light-emitting surface of the flexible display panel 10. When the flexible display panel is in the bent state, the at least one deformation detection unit 110 can detect the deformation amount at its disposing position in the bending region 100, thereby providing a basis for subsequent brightness compensation and the like, and effectively improving the display effect of the flexible display panel 10.

Referring to FIG. 1, the bending region 100 includes a display region 11 and a non-display region 12, and the at least one deformation detection unit 110 is disposed in the non-display region 12.

It is to be noted that, as shown in FIG. 1, the display region 21 of the flexible display panel 10 includes the display region 11 of the bending region 100 and the display region 13 of the non-bending region 200, and the non-display region 22 of the flexible display panel 10 includes the non-display region 12 of the bending region 100 and the non-display region 14 of the non-bending region 200. The display region 21 of the flexible display panel 10 is provided with multiple sub-pixels (not illustrated) for displaying images. Connection lines, driving circuits, and the like are arranged in the non-display region 12 of the flexible display panel 10. Since the deformation detection units 110 are disposed in the non-display region 12, the normal display of the flexible display panel 10 is not affected by the deformation detection units 110.

It is to be noted that a region between adjacent sub-pixels in the display region 11 does not have the light-emitting function and is a non-light-emitting area. In one or more embodiments, one or more deformation detection units 110 may be located between adjacent sub-pixels, such configuration does not significantly influence the normal display of the flexible display panel 10. In one or more embodiments, all deformation detection units 110 may be located between adjacent sub-pixels in the display region 11. Alternatively, some of the deformation detection units 110 are located between adjacent sub-pixels in the display region 11, and some of the deformation detection units 110 are disposed in the non-display region 12.

Figure 3:
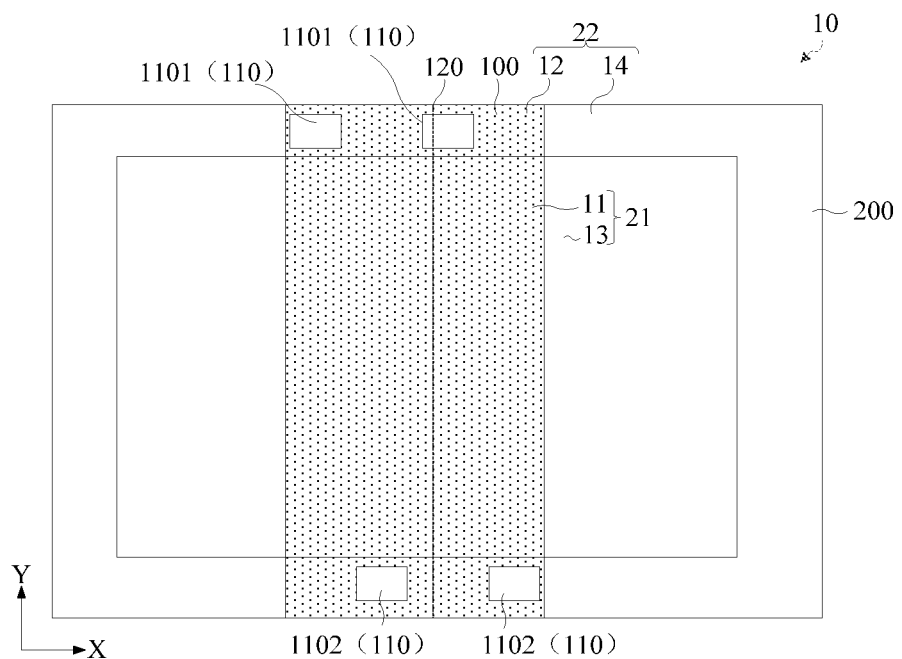
FIG. 3 is a schematic view of another flexible display panel according to an embodiment of the present disclosure.

FIG. 3 is a schematic view of another flexible display panel according to an embodiment of the present disclosure. As shown in FIG. 3, the flexible display panel includes two or more deformation detection units 110. In an exemplary embodiment, the deformation detection units 110 of the flexible display panel include: multiple first deformation detection units 1101 and multiple second deformation detection units 1102. The bending axis 120 in the bending region 100 extends along the Y direction. In the Y direction, the display region 11 has a first side and a second side opposite to the first side. The multiple first deformation detection units 1101 are located in the non-display region 22 on the first side of the display region 11, and the multiple second deformation detection units 1102 are located in the non-display region 22 on the second side of the display region 11. Along the X direction that is perpendicular to the Y direction, the first deformation detection units 1101 and the second deformation detection units 1102 are alternately arranged. The center of each of the first deformation detection units 1101 is on a first line parallel to the bending axis. The center of each of the second deformation detection units 1102 is on a second line parallel to the bending axis. The first lines are alternately arranged with the second lines.

It is to be noted that, with the above configuration, the deformation detection units 110 can measure the deformation amounts at multiple regions in the bending region 100, thereby enlarging the detection region and acquiring more accurate detection result. Furthermore, the deformation detection units 110 are disposed in the non-display region 12 on two sides of the display region 11, and a distance between the deformation detection units 110 is large, so that the space for manufacturing the deformation detection units 110 is increased, the manufacture difficulty is reduced, and erroneous connection between adjacent deformation detection units 110 is avoided.

It is to be understood that, in other implementation mode of the embodiment, as shown in FIG. 1, all the deformation detection units 110 may also be disposed in the non-display region 12 on the same side of the display region 11 as long as it can ensure that all the deformation detection units 110 are insulated from each other.

Referring to FIG. 3, the bending region 100 includes a bending axis 120 extending along a first direction. The flexible display panel 10 bends in a second direction along the bending axis 120 and the bending region is at two sides of the bending axis 120. The first direction is perpendicular to the second direction. The first direction is the Y direction, that is the extending direction of the bending axis 120 and the second direction is the X direction perpendicular to the extending direction of the bending axis 120. Furthermore, one or more deformation detection units 110 among the at least one deformation detection unit 110 are located on the bending axis 120.

It is to be noted that FIG. 3 only shows an example in which one deformation detection unit 110 is located on the bending axis 120, and the number of the deformation detection units 110 on the bending axis 120 is not limited in the present disclosure. In other implementation modes of the embodiment, multiple deformation detection units 110 may be located on the bending axis 120. In this case, multiple deformation detection units 110 are sequentially arranged along the extending direction of the bending axis 120.

It is to be noted that the deformation amount at the bending axis 120 is the largest, and the region in the vicinity of the bending axis has the worst display effect and most needs compensation. Therefore, at least one deformation detection unit 110 is disposed on the bending axis 120 to measure the deformation amount of the region close to the bending axis 120 for the subsequent compensation.

Figure 4:
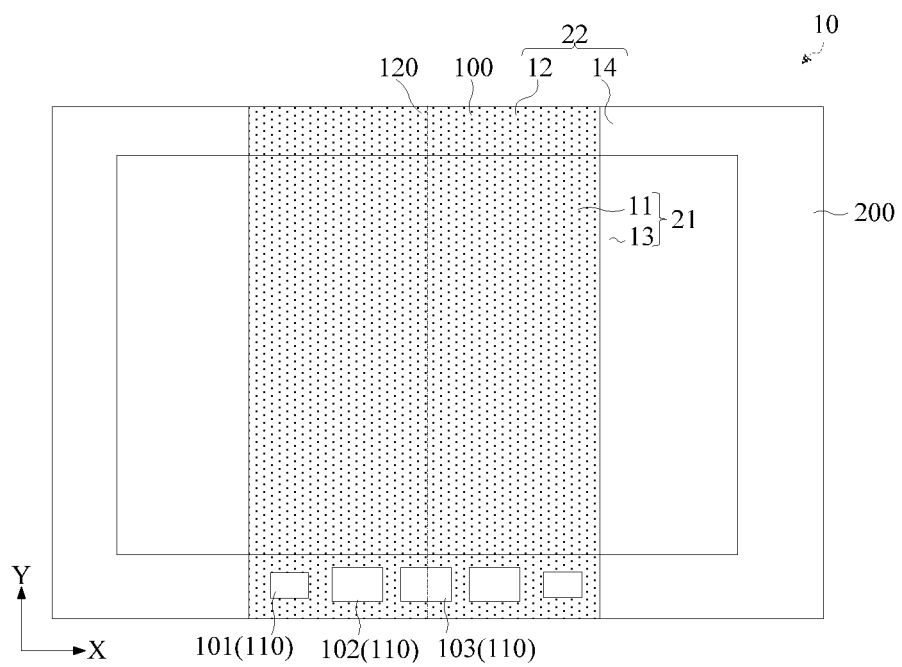
FIG. 4 is a schematic view of another flexible display panel according to an embodiment of the present disclosure.

FIG. 4 is a schematic view of another flexible display panel according to an embodiment of the present disclosure. As shown in FIG. 4, a size of a first deformation detection unit 110 closer to the bending axis is a1, a size of a second deformation detection units 110 farther away from the bending axis is a2, where a1>a2; and at least two deformation detection units 110 are different in sizes.

It is to be noted that the size of the deformation detection unit refers to an orthographic projection area of the deformation detection unit on the flexible display panel.

In this embodiment, the size of the deformation detection unit 110 having a smaller distance to the bending axis 120 is greater than or equal to the size of the deformation detection unit 110 having a larger distance to the bending axis 120. Exemplarily, referring to FIG. 4, the multiple deformation detection units 110 include a first deformation detection unit 101, a second deformation detection unit 102, and a third deformation detection unit 103. The third deformation detection unit 103 is closest to the bending axis 120. The distance between the first deformation detection unit 101 and the bending axis 120 is greater than the distance between the second deformation detection unit 102 and the bending axis 120. The size of the first deformation detection unit 101 is smaller than the size of the second deformation detection unit 102, and the size of the second deformation detection unit 102 is equal to the size of the third deformation detection unit 103.

It is to be noted that a detection range of the deformation detection unit 110 is positively correlated with the size of the deformation detection unit 110. Therefore, the deformation detection unit 110 with a larger size has a larger detection range, the deformation detection unit 110 with a smaller size has a smaller detection range. When the flexible display panel 10 is in the bent state, the deformation amount on the bending axis 120 is the largest, and the position farther away from the bending axis 120 has a smaller deformation amount. To accurately measure the deformation amounts of different positions in the bending region by using the deformation detection unit 110, the detection range of each deformation detection unit 110 is greater than or equal to the deformation amount of the corresponding position of the flexible display panel 10. Therefore, the deformation detection unit 110 closer to the bending axis 120 has a larger detection range. The deformation detection unit 110 farther away from the bending axis 120 does not necessarily need a detection range as large as that of the deformation detection unit 110 closer to the bending axis 120, and is arranged in a smaller size. In this way, the deformation amounts of multiple positions in the bending region can be accurately measured, and the area occupied by the deformation detection units 110 is reduced, thereby facilitating the miniaturization of the flexible display panel 10.

Figure 5:
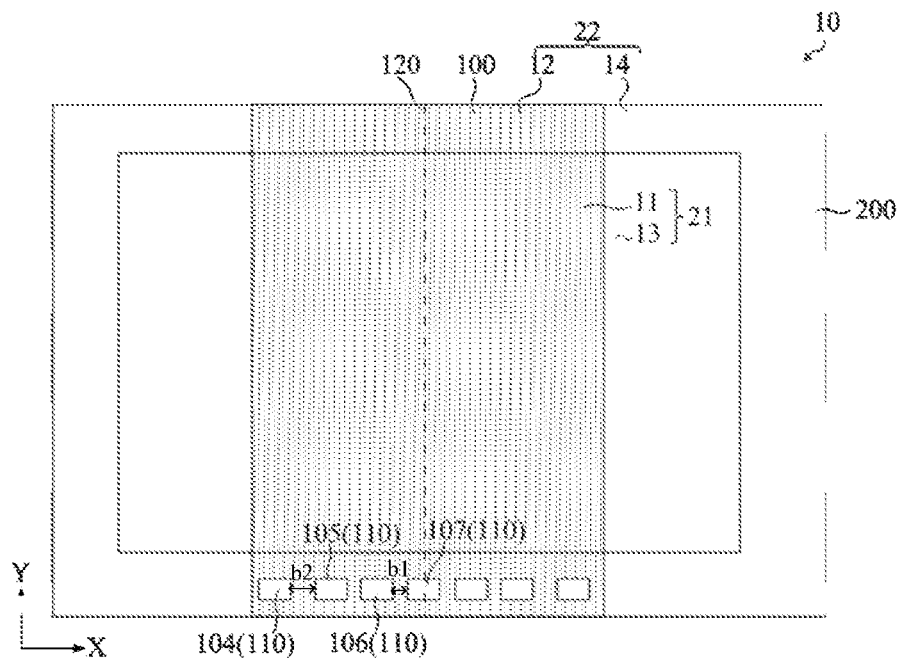
FIG. 5 is a schematic view of another flexible display panel according to an embodiment of the present disclosure.

FIG. 5 is a schematic view of another flexible display panel according to an embodiment of the present disclosure. As shown in FIG. 5, in the second direction (the X direction that is perpendicular to the extending direction of the bending axis 120), a width of a gap between neighboring deformation detection units 110 which are closer to the bending axis 120 is b1, a width of a gap between neighboring deformation detection units 110 which are farther away from the bending axis 120 is b2, where b1<b2. At least two pairs of neighboring deformation detection units 110 have different gap widths.

It is to be noted that neighboring deformation detection units 110 have a first gap in the X direction that is perpendicular to the extending direction of the bending axis 120, a width of the first gap remoter from the bending axis 120 is greater than or equal to a width of the first gap closer to the bending axis 120. Exemplarily, referring to FIG. 5, the flexible display panel includes a deformation detection unit 104, a deformation detection unit 105, a deformation detection unit 106, and a deformation detection unit 107. In the X direction, the gap between the deformation detection unit 104 and the deformation detection unit 105 is the first gap, the gap between the deformation detection unit 105 and the deformation detection unit 106 is the second gap, and a gap between the deformation detection unit 106 and the deformation detection unit 107 is the third gap. The second gap is closer to the bending axis 120 than the first gap, and the width of the second gap is smaller than the width of the first gap. The third gap is closer to the bending axis 120 than the second gap, and the width of the third gap is equal to the width of the second gap.

It is to be further noted that, positions on the flexible display panel 10 closer to the bending axis are under higher stress therefore have larger deformation amount. As a result, the deformation detection units disposed at closer positions require larger detection ranges. Therefore, along the X direction perpendicular to the extending direction of the bending axis 120, those regions closer to the bending axis 120 will experience higher strain so may deform more than those farther away during the bending time. It is possible to dispose denser deformation detection units 110 in this region. If the deformation detection units 110 have the same size, more than one deformation detection units 110 have a lager overall detection range in the region. Therefore, b1 can be configured less than or equal to b2. In this way, the deformation amounts in multiple regions can be more accurately measured, and the number of the deformation detection units 110 in a region farther away from the bending axis 120 can be reduced, and the total space occupied by the deformation detection units 110 is reduced, thereby facilitating the miniaturization of the flexible display panel 10.

Figure 6:
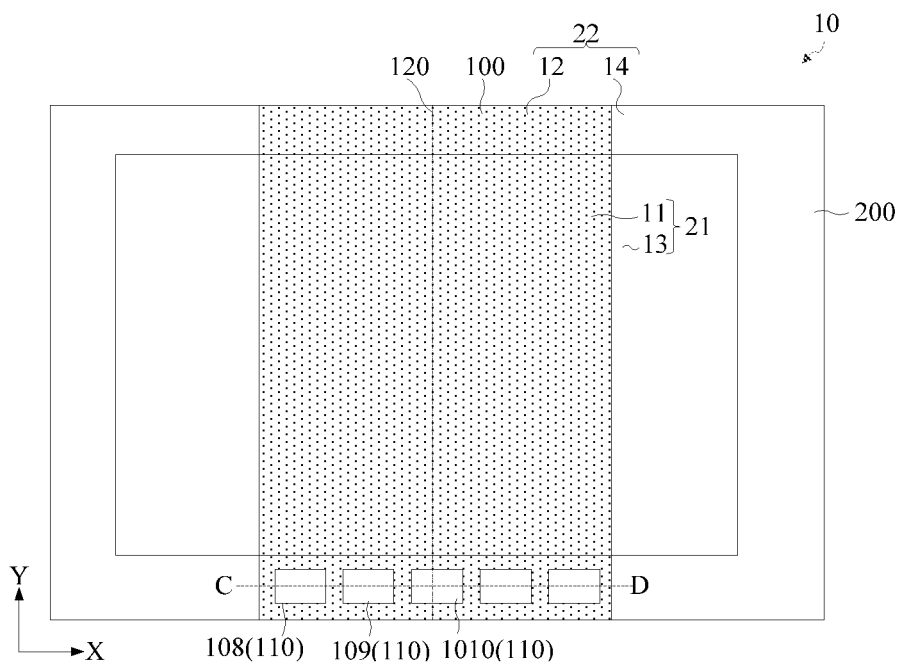
FIG. 6 is a schematic view of another flexible display panel according to an embodiment of the present disclosure.
Figure 7:
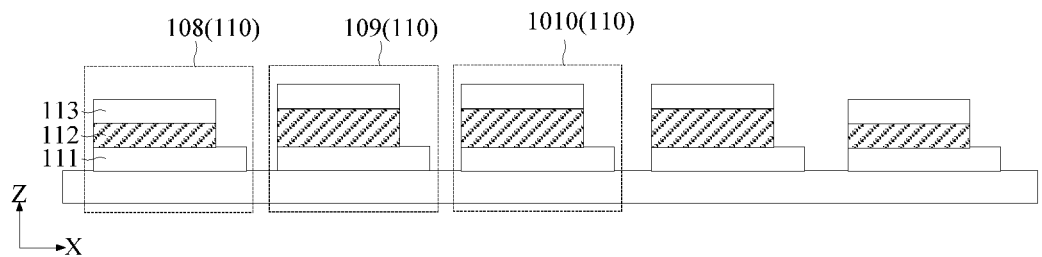
FIG. 7 is a cross sectional view of the flexible display panel taken along a line CD in FIG. 6.

FIG. 6 is a schematic view of another flexible display panel according to an embodiment of the present disclosure. FIG. 7 is a cross sectional view of the flexible display panel taken along a dotted line CD in FIG. 6. As shown in FIGS. 6 and 7, the thickness of the piezoelectric material function layer 112 in the deformation detection unit 110 closer to the bending axis 120 is c1, a thickness of the piezoelectric material function layer 112 in the deformation detection unit 110 farther away from the bending axis 120 is c2, and c1>c2. The piezoelectric material function layers 112 of at least two deformation detection units 110 have different thicknesses because thickness affects sensitivity of deformation measurement.

It is to be noted that in the X direction perpendicular to the extending direction of the bending axis 120, the thickness of the piezoelectric material function layer 112 of the deformation detection unit 110 closer to the bending axis 120 is greater than or equal to the thickness of the piezoelectric material function layer 112 of the deformation detection unit 110 farther away from the bending axis 120. Exemplarily, referring to FIGS. 6 and 7, the flexible display panel includes a deformation detection unit 108, a deformation detection unit 109, and a deformation detection unit 1010. The deformation detection unit 108 is farther away from the bending axis 120 than the deformation detection unit 109, the thickness of the piezoelectric material function layer 112 in the deformation detection unit 108 is smaller than that of the piezoelectric material function layer 112 in the deformation detection unit 109. The deformation detection unit 109 is further away from the bending axis 120 than the deformation detection unit 1010, and the thickness of the piezoelectric material function layer 112 in the deformation detection unit 109 is equal to that of the piezoelectric material function layer 112 in the deformation detection unit 1010.

It is to be further noted that the piezoelectric material function layer 112 with a larger thickness has a better bending bearing capability. Since the position closer to the bending axis has the larger deformation amount than those farther away, the bending stress applied to the deformation detection unit 110 is larger than those farther away too, so the deformation detection unit 110 needs to be built stronger. Therefore, the thickness of the piezoelectric material function layer 112 in the deformation detection unit closer to the bending axis 120 is configured to be greater than or equal to that of the piezoelectric material function layer 112 in the deformation detection unit farther away from the bending axis 120 to reduce the damage probability of the deformation detection unit 110.

In one or more embodiments, the thickness of the piezoelectric material function layer 112 is within a range of 0.5~2.5 μm.

It is to be noted that a larger thickness of the piezoelectric material function layer 112 will increase the manufacture time, affect the production efficiency, increase the cost, and affect the overall structural design of the flexible display panel 10. In addition, for the scheme in which the second electrodes of the multiple deformation detecting units 110 are connected, if the piezoelectric material function layer 112 is too thick, a large step may results, giving poor film quality where the second electrodes 113 are formed. In a worst case, the second electrode 113 may crack. On the other hand, if the piezoelectric material function layer 112 is too thin, the film uniformity of the piezoelectric material function layer 112 may be poor, the signal may be noisy and the detection algorithm can be greatly influenced by the signal fluctuation. By setting the thickness of the piezoelectric material function layer 112 within the proper range, the above problem can be avoided. The preferred thickness range of the piezoelectric material function layer 112 is 0.5~2.5 μm.

Figure 8:
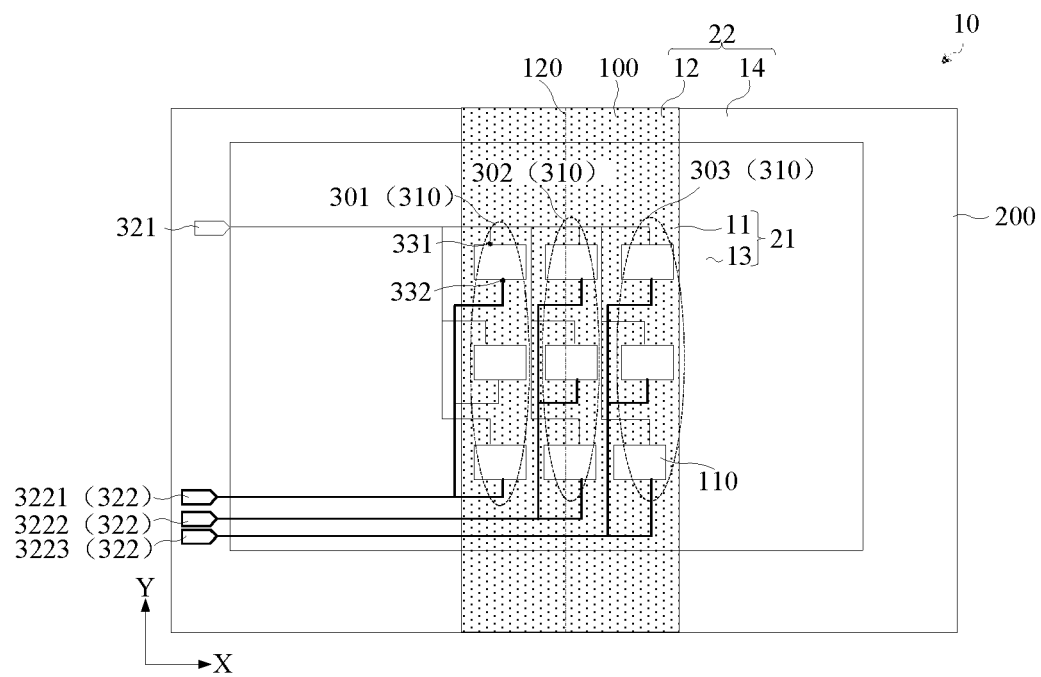
FIG. 8 is a schematic view of another flexible display panel according to an embodiment of the present disclosure.

FIG. 8 is a schematic view of another flexible display panel according to an embodiment of the present disclosure. As shown in FIG. 8, the flexible display panel includes deformation detection unit groups 310 arranged in the second direction (the X direction which is perpendicular to the extending direction of the bending axis). Each deformation detection unit group 310 includes at least one deformation detection unit 110 arranged in the first direction (the extending direction of the bending axis). The first electrode of the deformation detection unit 110 has an end 331, and the second electrode of the deformation detection unit 110 has an end 332. The ends 331 of the first electrodes of the deformation detection units 110 in all the deformation detection unit groups 310 are connected to a first driving signal line 321. The ends 332 of the second electrodes of the deformation detection units 110 in the same deformation detection unit group 310 are connected to a respective one of second driving signal lines 322, and the second electrodes of the deformation detection units 110 in different deformation detection unit groups 310 are electrically connected to different second driving signal lines 322. Exemplarily, referring to FIG. 8, the flexible display panel 10 includes three second driving signal lines 322 and three deformation detection unit groups 310. The three second driving signal lines 322 respectively are a second driving signal 3221, a second driving signal 3222, and a second driving signal 3223. The three deformation detection unit groups 310 respectively are a deformation detection unit group 301, a deformation detection unit group 302, and a deformation detection unit group 303. The second electrodes of the deformation detection units 110 in the deformation detection unit group 301 are electrically connected to the second driving signal 3221. The second electrodes of the deformation detection units 110 in the deformation detection unit group 302 are electrically connected to the second driving signal 3222. The second electrodes of the deformation detection units 110 in the deformation detection unit groups 303 are electrically connected to the second driving signal 3223. It is to be noted that the first driving signal line is configured to transmit a first driving signal, the first driving signal may be a common voltage signal Vcom, and the second driving signal line is configured to transmit a second driving signal, the second driving signal may be a detection signal.

As shown in FIG. 8, each deformation detection unit group includes two or more deformation detection units which are arranged on a line parallel to the bending axis 120. As discussed above, positions on this line have the same deformation amount, so the configuration of the deformation detection units 110 shown in FIG. 8 can provide a stronger detection signal. If only one deformation detection unit is disposed on the line parallel to the bending axis 12, the detection signal may be too small, which causes a poor detection precision.

Figure 9:
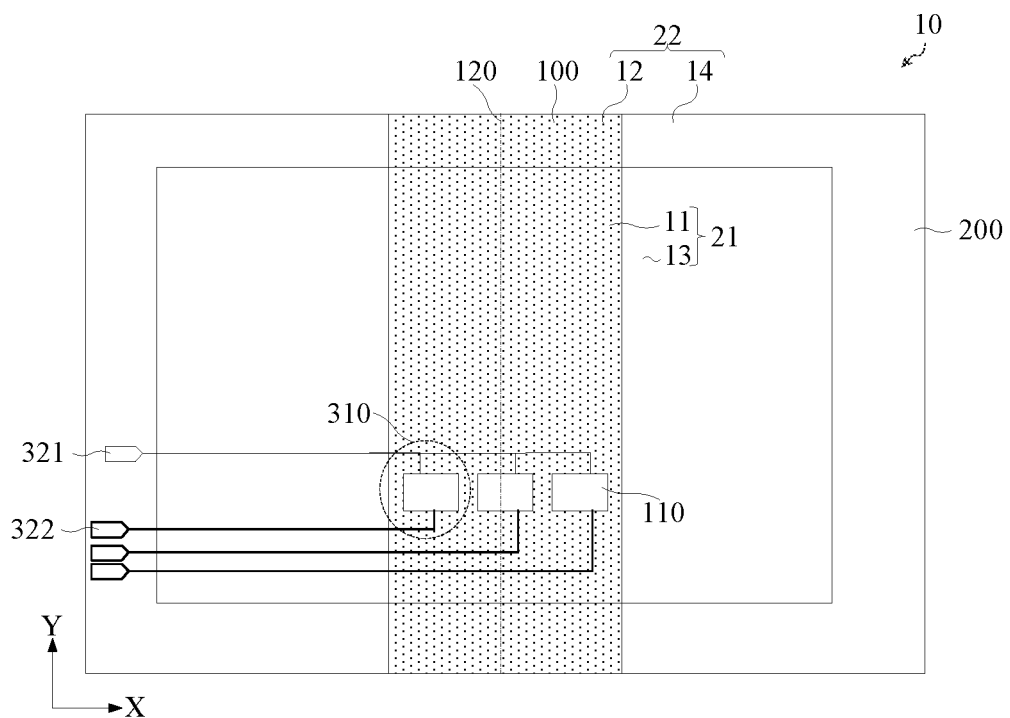
FIG. 9 is a schematic view of another flexible display panel according to an embodiment of the present disclosure.

It is to be noted that FIG. 8 shows an example in which the deformation detection unit group 310 includes three deformation detection units 110, but the number of deformation detection units 110 in the deformation detection unit group 310 is not to limited in the present disclosure. In other embodiments, the number of the deformation detection units 110 in the deformation detection unit group 310 may be one, as shown in FIG. 9. Alternatively, the number of the deformation detection units 110 in the deformation detection unit group 310 may be two or more than three. In the embodiments where the number of the deformation detection units 110 in the deformation detection unit group 310 is two or more than three, the deformation detection units 110 in the deformation detection unit group 310 may be connected to the first driving signal line 321 and the second driving signal line 322 in the same manner shown in FIG. 8. In some embodiments, different deformation detection unit groups 310 may have the same deformation detection unit quantity, as shown in FIG. 8. In some embodiments, different deformation detection unit groups 310 may have different deformation detection unit quantities, as shown in FIG. 10.

Figure 10:
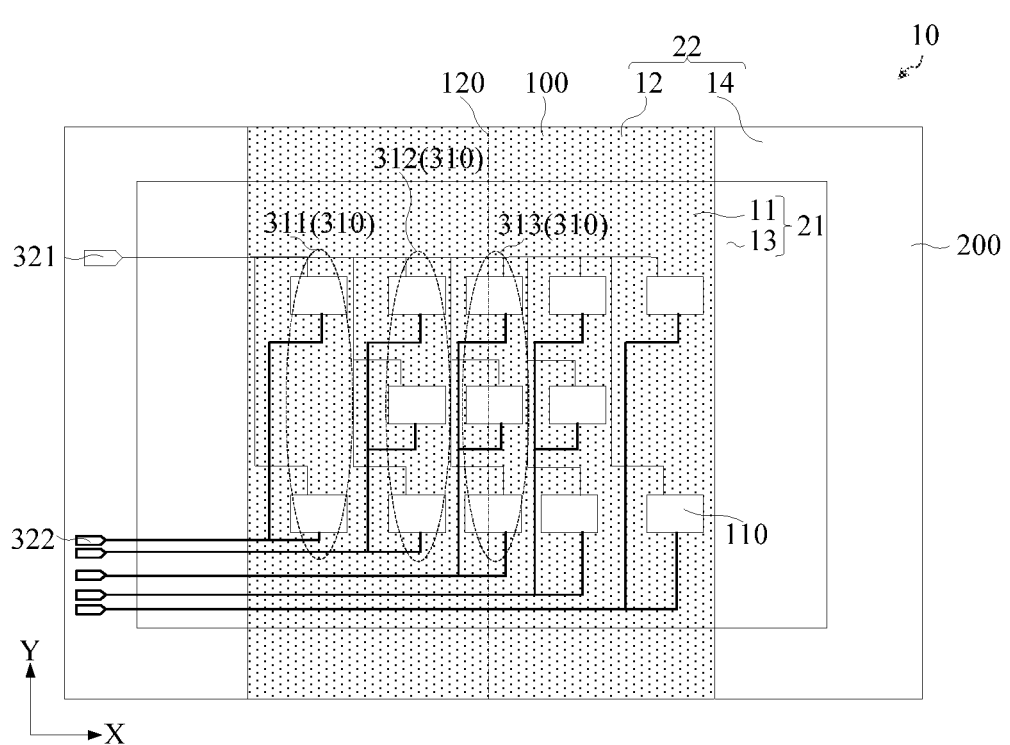
FIG. 10 is a schematic view of another flexible display panel according to an embodiment of the present disclosure.

Referring to FIG. 10, the number of deformation detection units 110 in the deformation detection unit group 310 closer to the bending axis 120 in the bending region 100 is d1, the number of deformation detection units 110 in the deformation detection unit group 310 farther away from the bending axis 120 in the bending region 100 is d2, and d1>d2. At least two deformation detection unit groups 310 are different in deformation detection unit quantity.

In the embodiment shown in FIG. 10, in the X direction that is perpendicular to the extending direction of the bending axis 120, the number of the deformation detection units 110 in the deformation detection unit group 310 closer to the bending axis 120 is greater than or equal to the number of the deformation detection units 110 in the deformation detection unit group 310 farther away from the bending axis. Exemplarily, referring to FIG. 10, the flexible display panel includes a first deformation detection unit group 311, a second deformation detection unit group 312, and a third deformation detection unit group 313. The first deformation detection unit group 311 is farthermost one to the bending axis 120, and the third deformation detection unit group 313 is the closest one to the bending axis 120. The first deformation detection unit group 311 includes two deformation detection units 110. The second deformation detection unit group 312 includes three deformation detection units 110. The number of the deformation detection units 110 in the first deformation detection unit group 311 is less than the number of the deformation detection units 110 in the second deformation detection unit group 311. The third deformation detection unit group 313 includes three deformation detection units 110. The number of the deformation detection units 110 in the second deformation detection unit group 312 is equal to the number of the deformation detection units 110 in the third deformation detection unit group 313.

It is to be further noted that among the lines which are parallel to the bending axis 120 in the bending region, one having a smaller distance to the bending axis 120 has a larger deformation amount. The configuration of b1≤b2 and the configuration of d1≤d2 have similar advantages. The deformation amounts at the lines parallel to the bending axis 120 can be accurately measured, and the line which is farther away from the bending axis 120 is disposed with less deformation detection units 110, thereby facilitating the miniaturization of the flexible display panel 10.

Figure 11:
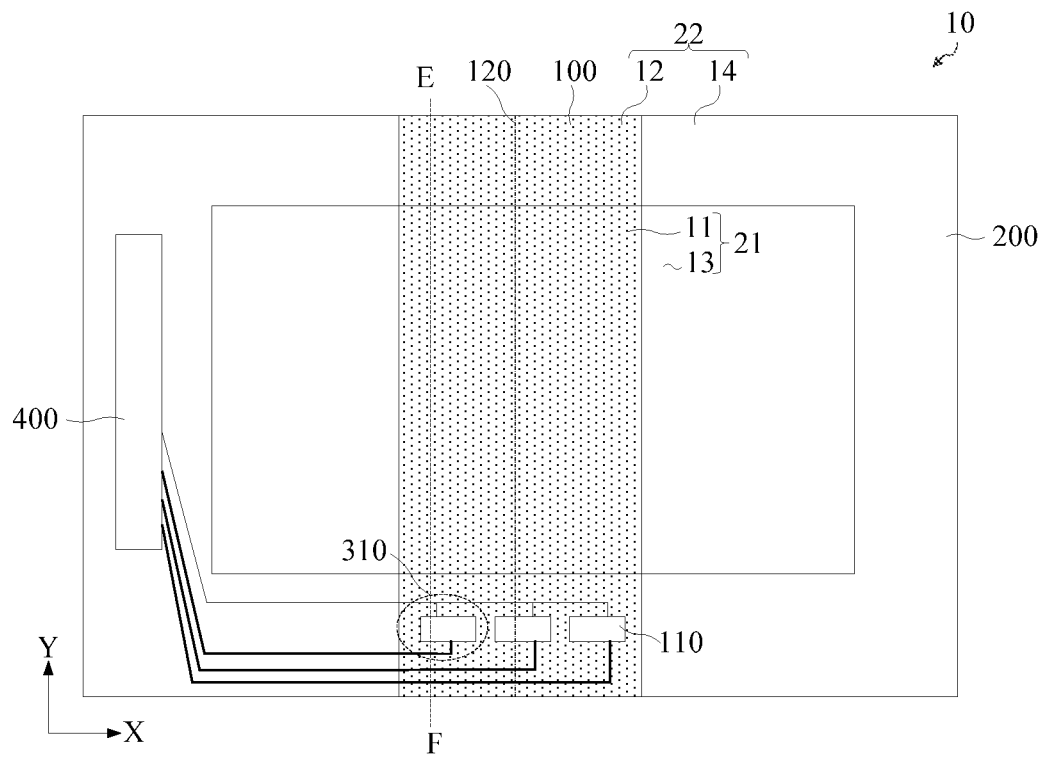
FIG. 11 is a schematic view of another flexible display panel according to an embodiment of the present disclosure.
Figure 12:
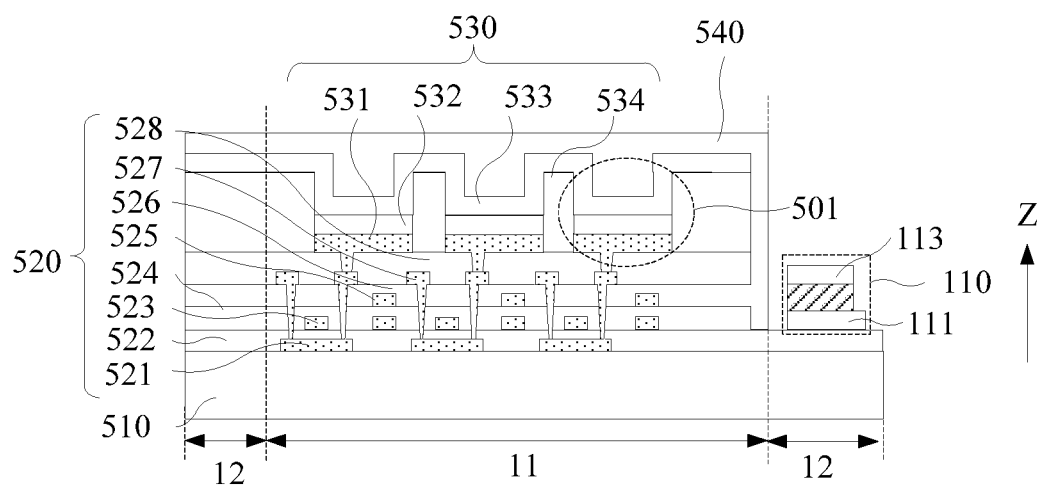
FIG. 12 is a cross sectional view of the flexible display panel taken along a line EF in FIG. 11.

FIG. 11 is a schematic view of another flexible display panel according to an embodiment of the present disclosure. FIG. 12 is a cross sectional view of the flexible display panel taken along a dotted line EF in FIG. 11. As shown in FIG. 12, the flexible display panel includes a base substrate 510, a drive circuit layer 520, a light-emitting unit layer 530, and an encapsulation layer 540. The drive circuit layer 520, the light-emitting unit layer 530, and the encapsulation layer 540 are sequentially stacked on the base substrate in a Z direction that is perpendicular to a light-emitting surface of the flexible display panel. The drive circuit layer 520 includes an active layer 521, a gate insulating layer 522, a gate metal layer 523, a first interlayer insulating layer 524, a capacitor metal layer 525, a second interlayer insulating layer 526, a source/drain metal layer 527, and a passivation layer 528 which are sequentially stacked on the base substrate. The light-emitting unit layer 530 includes a pixel definition layer 534, which defines multiple organic light-emitting units 501. The organic light-emitting unit 501 includes an electrode 531, a light-emitting function layer 532 and an electrode 533, which are sequentially stacked on the drive circuit layer 520. In an embodiment, the electrode 531 is a cathode, and the electrode 533 is an anode. In another embodiment, electrode 531 is an anode, and the electrode 533 is a cathode. Along the Z direction which is perpendicular to the light-emitting surface of the flexible display panel, any two of the gate metal layer 523, the capacitor metal layer 525, the source/drain metal layer 527, a metal layer in which the electrode 531 is located and a metal layer in which the electrode 532 is located constitute a metal layer group. The metal layer group includes a first metal layer and a second metal layer. The first metal layer is between the second metal layer and the base substrate 510.

The first electrode 111 is located at the first metal layer and the second electrode 113 is located at the second metal layer.

It is to be noted that the configuration of three organic light-emitting units 501 shown in FIG. 12 is merely an example, and the number of the organic light-emitting units 501 is not limited in the present disclosure. In other implementation modes of the embodiment, the number of organic light-emitting units 501 in the cross sectional view of FIG. 12 may be other values, which is not specifically limited in the embodiment. In addition, FIG. 12 merely shows an example in which the first electrode 111 of the deformation detection unit 110 is located at the gate metal layer 523 and the second electrode 113 is located at the source/drain metal layer 527, which is not intend to limit the present disclosure. The first electrode 111 and the second electrode 113 may be located at any two of the above metal layers as long as the first electrode 111 and the second electrode 113 are arranged along the direction perpendicular to the light-emitting surface of the flexible display panel.

In the above embodiment, the first electrode 111 and other function element (the gate metal) of the flexible display panel are formed in the same layer, and the second electrode 113 and other function element (the source metal and the drain metal) of the flexible display panel are formed in the same layer. Therefore, there is no need to add a dedicated layer for the first electrode 111 and a dedicated layer for the second electrode 113, thereby reducing the number of layers in the flexible display panel, avoiding increasing the thickness of the flexible display panel for disposing the deformation detection unit 110 and facilitating the thinning of the flexible display panel.

Referring to FIG. 11, the flexible display panel 10 further includes a drive IC 400 for providing a driving signal (light-emitting driving signal) for the organic light emitting units. The drive IC 400 is further used for providing the first driving signal and the second driving signals.

In the embodiment shown in FIG. 11, the first driving signal and the second driving signals are generated by the drive IC 400 that is used for providing the driving signal for the organic light emitting units, so that there is no need to specially provide other components to provide the first driving signal and the second driving signals. If an additional circuit is arranged for generating the first driving signal and the second driving signals, the number of internal components of the flexible display panel 10 will be increased and the overall size of the flexible display panel 10 is increased. The configuration in FIG. 11 facilitates the miniaturization of the flexible display panel 10.

It is to be noted that, to more clearly illustrate the configuration mode and connection mode of the deformation detection units 110, the proportion of the deformation detection unit 110 and the bending region 100 in the flexible display panel 10 is enlarged in the related drawing, therefore the related drawings are only schematic diagrams, do not represent the actual size and proportion.

Figure 13:
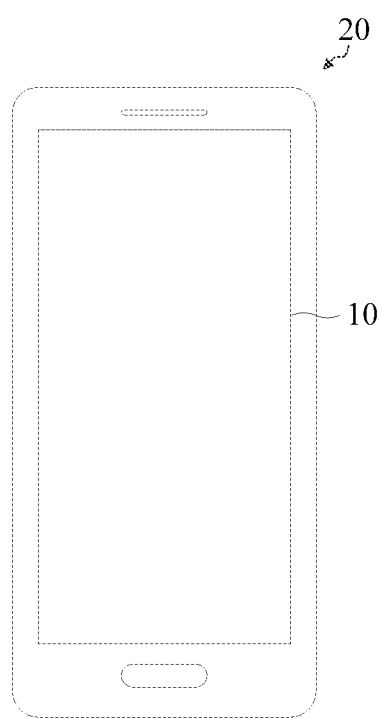
FIG. 13 is a schematic view of a flexible display device according to an embodiment of the present disclosure.

FIG. 13 is a schematic view of a flexible display device according to an embodiment of the present disclosure. As shown in FIG. 13, the flexible display device 20 includes the flexible display panel 10 described in any one of embodiments of the present disclosure. Since the flexible display device 20 provided by the present application includes the flexible display panel 10 described in any one of the embodiments of the present disclosure, the flexible display device 20 has corresponding beneficial effects of the flexible display panel 10, and details about that will not be described herein.

It is to be noted that the above are merely exemplary embodiments of the present disclosure and the technical principles used therein. It can be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A flexible display panel, comprising:
   a bending region capable of bending a long a bending axis;
   a non-bending region; and
   at least one deformation detection unit disposed in the bending region,
   wherein each of the at least one deformation detection unit comprises a first electrode, a piezoelectric material function layer, and a second electrode, wherein the first electrode, the piezoelectric material function layer, and the second electrode are sequentially stacked along a direction perpendicular to a light-emitting surface of the flexible display panel;
   wherein the bending region comprises a display region and a non-display region, and wherein the at least one deformation detection unit is disposed in the non-display region;
   wherein a number of the at least one deformation units is greater than or equal to 2, the at least one deformation detection unit comprises a plurality of first deformation detection units and a plurality of second deformation detection units, wherein in an extending direction of the bending axis of the bending region, the display region of the bending region has a first side and a second side opposite to the first side, wherein the plurality of first deformation detection units are disposed on the first side of the display region and the plurality of second deformation detection units are disposed on the second side of the display region, wherein in the direction perpendicular to the extending direction of the bending axis, the plurality of first deformation detection units are arranged alternately with the plurality of second deformation detection units.

2. The flexible display panel of claim 1, wherein the bending axis extends along a first direction, the flexible display panel is bent towards the bending axis along a second direction to form the bending region, wherein the first direction is perpendicular to the second direction; and
   wherein one or more deformation detection units among the at least one of deformation detection unit are located on the bending axis.

3. The flexible display panel of claim 2, wherein the at least one deformation detection unit comprises a first deformation detection unit and a second deformation detection unit, the first deformation detection unit is closer to the bending axis than the second deformation unit, and a size of the first deformation detection unit is greater than a size of the second deformation detection unit.

4. The flexible display panel of claim 2, wherein the at least one deformation detection unit comprises two neighboring deformation detection units spaced apart by a first gap in the second direction and another two neighboring deformation detection units spaced apart by a second gap in the second direction, the first gap is closer to the bending axis than the second gap and is less than the second gap.

5. The flexible display panel of claim 2, wherein the at least one deformation detection unit comprises a first deformation detection unit and a second deformation detection unit, the first deformation detection unit is closer to the bending axis than the second deformation detection unit, a thickness of the piezoelectric material function layer of the first deformation detection unit is greater than a thickness of the piezoelectric material function layer of the second deformation detection unit.

6. The flexible display panel of claim 2, further comprising: a first driving signal line and second driving signal lines;
wherein the at least one deformation detection unit comprises deformation detection unit groups arranged in the second direction, wherein the deformation detection unit groups are in one-to-one correspondence with the second driving signal lines, and wherein the plurality of deformation detection units is arranged in the first direction in each of the deformation detection unit groups,
wherein the first electrodes of the plurality of deformation detection units are connected to the first driving signal line,
wherein the second electrodes of the plurality of deformation detection units in each of the deformation detection unit groups are connected to one of the second driving signal lines.

7. The flexible display panel of claim 6, wherein the deformation detection unit groups comprise a first deformation detection unit group and a second deformation detection unit group, the first deformation detection unit group is closer to the bending axis than the second deformation detection unit group, and a number of deformation detection units in the first deformation detection unit group is greater than a number of deformation detection units in the second deformation detection unit group.

8. The flexible display panel of claim 1, wherein a thickness of the piezoelectric material function layer is within a range of 0.52.5 μm.

9. The flexible display panel of claim 1, further comprising:
a base substrate, a drive circuit layer, a light-emitting unit layer, and an encapsulation layer, wherein the drive circuit layer, the light-emitting unit layer, and the encapsulation layer are sequentially stacked on the base substrate in a direction perpendicular to a light-emitting surface of the flexible display panel;
wherein the drive circuit layer comprises: an active layer, a gate insulating layer, a gate metal layer, a first interlayer insulating layer, a capacitor metal layer, a second interlayer insulating layer, a source/drain metal layer, and a passivation layer which are sequentially stacked on the base substrate;
wherein the light-emitting unit layer comprises a pixel definition layer, which defines a plurality of organic light-emitting units, wherein each of the plurality of organic light-emitting units comprises a third electrode, a light-emitting function layer, and a fourth electrode sequentially stacked on the drive circuit layer;
wherein the first electrode is arranged on a same layer as one of: the gate metal layer, the capacitor metal layer, the source/drain metal layer, a metal layer in which the third electrode is located, and a metal layer in which the fourth electrode; and the second electrode is arranged on a same layer as one of: the gate metal layer, the capacitor metal layer, the source/drain metal layer, the metal layer in which the third electrode is located, and the metal layer in which the fourth electrode, wherein the first electrode and the second electrode are in different layers, and the first electrode is closer to the base substrate than the second electrode.

10. The flexible display panel of claim 9, further comprising a drive IC, wherein the drive IC is configured to provide a light-emitting driving signal for the plurality of organic light-emitting units; and
wherein the drive IC is further configured to provide a first driving signal and second driving signals.

11. A flexible display device, comprising a flexible display panel, wherein the flexible display panel comprises:
a bending region comprising a bending axis;
a non-bending region; and
at least one deformation detection unit disposed in the bending region, wherein each of the at least one deformation detection unit comprises a first electrode, a piezoelectric material function layer, and a second electrode, wherein the first electrode, the piezoelectric material function layer, and the second electrode are sequentially stacked along a direction perpendicular to a light-emitting surface of the flexible display panel;
wherein the bending axis extends along a first direction, wherein the flexible display panel is bent towards the bending axis along a second direction to form the bending region, wherein the first direction is perpendicular to the second direction;
wherein one or more deformation detection units among the at least one of deformation detection unit are located on the bending axis;
wherein the at least one deformation detection unit comprises deformation detection unit groups; and
wherein the deformation detection unit groups comprise a first deformation detection unit group and a second deformation detection unit group, the first deformation detection unit group is closer to the bending axis than the second deformation detection unit group, and a number of deformation detection units in the first deformation detection unit group is greater than a number of deformation detection units in the second deformation detection unit group.

12. The flexible display device of claim 11, wherein the bending region comprises a display region and a non-display region, and the at least one deformation detection unit is disposed in the non-display region.

13. The flexible display device of claim 12, wherein a number of the at least one deformation detection units is greater than or equal to 2, and the at least one deformation detection unit comprises a plurality of first deformation detection units and a plurality of second deformation detection units, wherein in an extending direction of the bending axis of the bending region, the display region of the bending region has a first side and a second side opposite to the first side, the plurality of first deformation detection units are disposed on the first side of the display region and the plurality of second deformation detection units are disposed on the second side of the display region, wherein in the direction perpendicular to the extending direction of the bending axis, the plurality of first deformation detection units are arranged alternately with the plurality of second deformation detection units.

14. The flexible display device of claim 11, wherein the at least one deformation detection unit comprises a first deformation detection unit and a second deformation detection unit, wherein the first deformation detection unit is closer to the bending axis than the second deformation unit, and wherein a size of the first deformation detection unit is greater than a size of the second deformation detection unit.

15. The flexible display device of claim 11, wherein the at least one deformation detection unit comprises two neighboring deformation detection units spaced apart by a first gap in the second direction and another two neighboring deformation detection units spaced apart by a second gap in the second direction, the first gap is closer to the bending axis than the second gap and is less than the second gap.

16. The flexible display device of claim 11, wherein the flexible display panel comprises: a first driving signal line and second driving signal lines, wherein the at least one deformation detection unit comprises deformation detection unit groups arranged in the second direction, the deformation detection unit groups are in one-to-one correspondence with the second driving signal lines, and each of the deformation detection unit groups comprises deformation detection units arranged in the first direction,
wherein the first electrodes of the deformation detection units in all of the deformation detection unit groups are connected to the first driving signal line,
wherein the second electrodes of the deformation detection units in each of the deformation detection unit groups are connected to a respective one of the second driving signal lines.

17. A flexible display panel, comprising:
a bending region capable of bending a long a bending axis;
a non-bending region; and
at least one deformation detection unit disposed in the bending region,
wherein each of the at least one deformation detection unit comprises a first electrode, a piezoelectric material function layer, and a second electrode, wherein the first electrode, the piezoelectric material function layer, and the second electrode are sequentially stacked along a direction perpendicular to a light-emitting surface of the flexible display panel;
wherein the bending axis extends along a first direction, the flexible display panel is bent towards the bending axis along a second direction to form the bending region, wherein the first direction is perpendicular to the second direction;
wherein one or more deformation detection units among the at least one of deformation detection unit are located on the bending axis;
wherein the flexible display panel further satisfies at least one of following characteristics:
wherein the at least one deformation detection unit comprises a first deformation detection unit and a second deformation detection unit, the first deformation detection unit is closer to the bending axis than the second deformation unit, and a size of the first deformation detection unit is greater than a size of the second deformation detection unit;
wherein the at least one deformation detection unit comprises two neighboring deformation detection units spaced apart by a first gap in the second direction and another two neighboring deformation detection units spaced apart by a second gap in the second direction, the first gap is closer to the bending axis than the second gap and is less than the second gap;
wherein the at least one deformation detection unit comprises a first deformation detection unit and a second deformation detection unit, the first deformation detection unit is closer to the bending axis than the second deformation unit, a thickness of the piezoelectric material function layer of the first deformation detection unit is greater than a thickness of the piezoelectric material function layer of the second deformation detection unit; or
wherein the flexible display panel further comprising: a first driving signal line and second driving signal lines;
wherein the at least one deformation detection unit comprises deformation detection unit groups arranged in the second direction, wherein the deformation detection unit groups are in one-to-one correspondence with the second driving signal lines, and wherein the plurality of deformation detection units is arranged in the first direction in each of the deformation detection unit groups,
wherein the first electrodes of the plurality of deformation detection units are connected to the first driving signal line,
wherein the second electrodes of the plurality of deformation detection units in each of the deformation detection unit groups are connected to one of the second driving signal lines.

18. The flexible display panel of claim 17, wherein the deformation detection unit groups comprise a first deformation detection unit group and a second deformation detection unit group, the first deformation detection unit group is closer to the bending axis than the second deformation detection unit group, and a number of deformation detection units in the first deformation detection unit group is greater than a number of deformation detection units in the second deformation detection unit group.

* * * * *